Feb. 14, 1956  H. C. FISCHER ET AL  2,734,357
BEVERAGE COOLER AND DISPENSER
Filed April 10, 1952  2 Sheets-Sheet 1
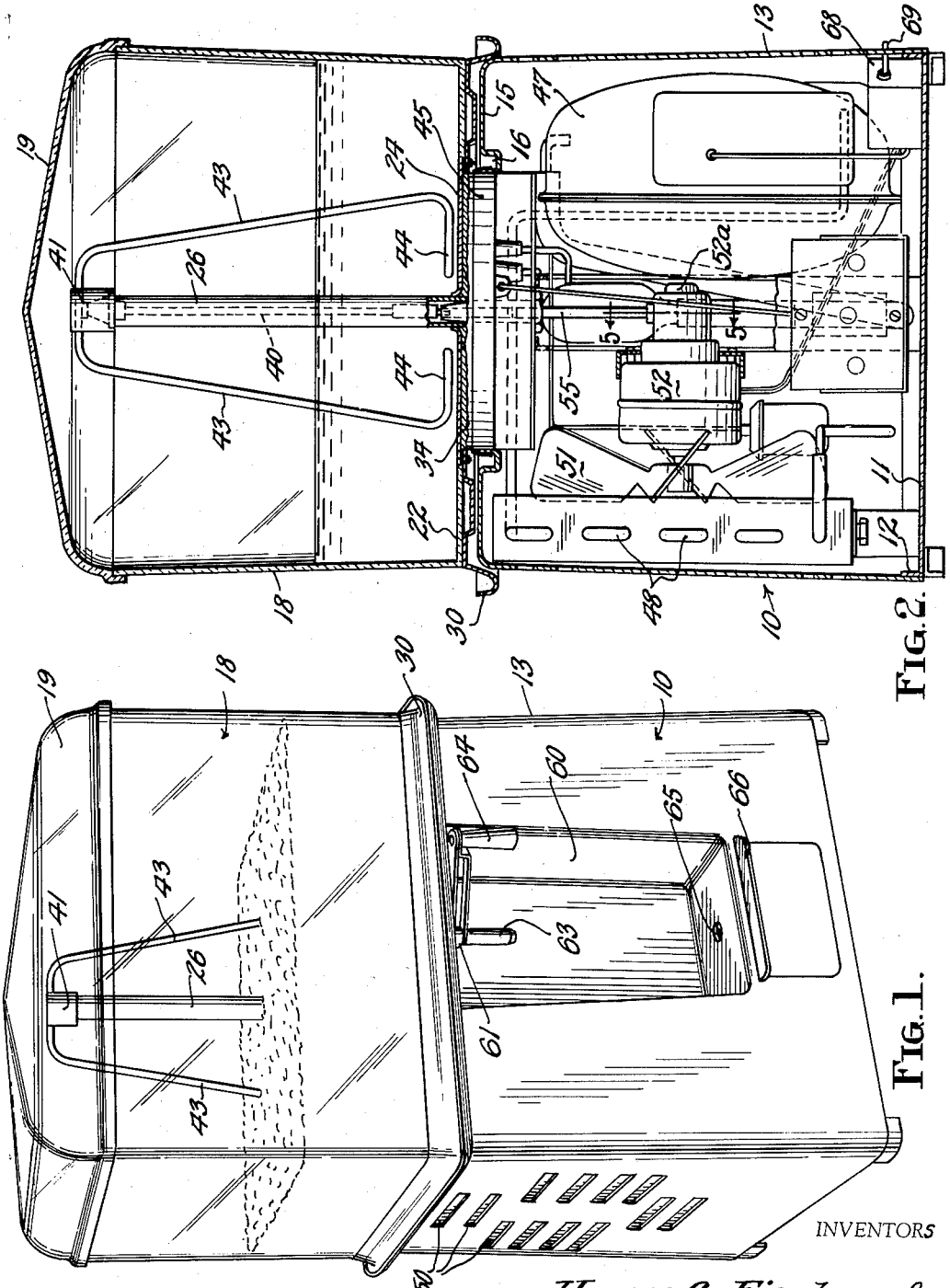
INVENTORS
Harry C. Fischer &
Louis P. Benua
BY
W. S. McDowell
ATTORNEY INVENTORS
Harry C. Fischer &
Louis P. Benua
BY *W. S. McDowell*
ATTORNEY

United States Patent Office 2,734,357
Patented Feb. 14, 1956

2,734,357

BEVERAGE COOLER AND DISPENSER

Harry C. Fischer, Columbus, and Louis P. Benua, Gahanna, Ohio, assignors to The Ebco Manufacturing Company, Columbus, Ohio, a corporation of Ohio Application April 10, 1952, Serial No. 281,636

2 Claims. (Cl. 62—141)

The present invention relates generally to liquid cooling and dispensing apparatus, and more specifically to an improved electrically actuated, refrigerated beverage dispenser of a type to be employed in restaurants, drug stores and similar eating establishments for dispensing a refrigerated beverage, such as fruit juices or the like.

In the past, various types of refrigerated beverage dispensers have been used, or proposed for use, wherein a liquid beverage was stored and subjected to refrigeration prior to sale to consumers. However, prior dispensers of this type of which we have knowledge are objectionable in that they are generally difficult to maintain in a cleanly and sanitary condition, due to the inaccessible location and arrangement of parts coming in direct contact with the beverage to be dispensed, and also due to the general bulk and weight of the dispensers as units. Further, when such dispensers are used in connection with fruit juices or other acid-containing liquids, the liquid-receiving and contacting parts of the dispenser must, of necessity, be formed from materials which are not subject to chemical attack by such liquids, and yet it is desirable to employ materials which, from the standpoint of heat exchange, provide for efficient cooling of the beverage to be dispensed, and generally, materials which possess good corrosion-resistance lack the desirable property of high heat conductivity. Also, dispensers to be used in connection with fruit juices, particularly juices which tend to separate or stratify, such as orange juice, must be provided with mechanical agitators or stirring devices which further complicate the assembly of the dispenser and render cleaning thereof more difficult.

It follows, therefore, that the primary object of the present invention is to provide a refrigerated dispenser for fruit juices and the like which comprises a compact cabinet-type unit divided into an upper receptacle section and a lower base section, and wherein the two sections may be conveniently and easily separated from one another merely by lifting the receptacle section off of the base section, thus enabling the receptacle section which contains all of the parts of the dispenser which come in contact with the beverage to be easily cleaned and thereafter replaced upon the base section and filled with the desired beverage; the base section of the dispenser containing the elements of an ordinary gas-liquid refrigeration system including a "cold plate" positioned in the upper portion thereof and arranged to be directly contacted by a cooperative high heat conductive "contact plate" carried on the bottom of the receptacle section and arranged in good heat transfer relationship with a stainless steel, or other chemically resistant metallic plate forming a part of the bottom wall of the receptacle section; and wherein the receptacle section carries therein a driven agitator or beverage stirring device having a drive shaft extending through the bottom wall of the receptacle for removable insertion within a cooperative motor-driven socket device carried in the base section of the dispenser.

It is another object of the present invention to provide in a beverage dispenser a mechanically efficient refrigeration and heat exchange assembly which comprises a flat cold plate containing the evaporator coils of a gas-liquid refrigeration system, the cold plate being formed from a high heat conductivity metal such as aluminum or copper and being arranged to flatly receive thereagainst a cooperative contact plate of similar metal carried by a second relatively thin heat exchanger plate of corrosion resistant metal forming a partial bottom wall for the beverage-containing receptacle of the dispenser and arranged to be directly contacted by the beverage, whereby heat may be effectively transferred from the beverage by way of the heat exchanger plate, contact plate and the cold plate of the refrigeration system; and wherein the contact plate may be easily disengaged from the cold plate to permit ready removal of the receptacle portion of the dispenser from the refrigerating system after the manner of the removal of a pan from the hot plate or burner of a kitchen range.

A further object of the invention is to provide a beverage dispenser of the character set forth which embodies a motor driven agitator or stirring mechanism positioned for rotation within the receptacle section of the dispenser, and driven in rotation by a vertically arranged shaft extending upwardly through the central portion of the receptacle and within an elongated bearing tube having a liquid-tight connection with the heat-exchanger plate carried in the bottom wall of the receptacle, and wherein the shaft is arranged for detachable driving connection with a socket member carried in the lower base section of the dispenser and driven by an electric motor mounted in said base section, the agitator and its associated drive shaft being removable from the base section in conjunction with the receptacle section of the dispenser.

For a further and more detailed understanding of the present invention and the various additional objects and advantages realized therefrom, reference is to be had to the following description and the accompanying drawings, wherein:

Fig. 1 is a perspective view of a beverage dispenser formed in accordance with the present invention;

Fig. 2 is a medial longitudinal vertical sectional view taken through the dispenser and showing the refrigeration apparatus and agitator drive system in elevation;

Figure 3:
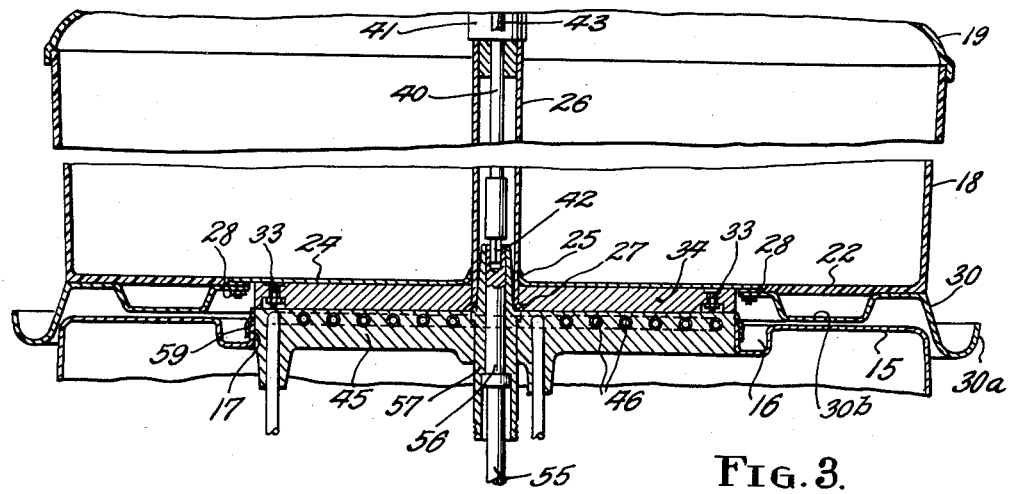
Fig. 3 is an enlarged fragmentary vertical sectional view taken through the heat exchange assembly of the present dispenser.
Figure 5:
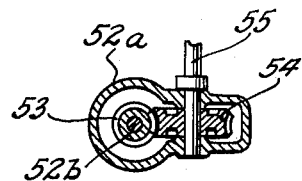
Fig. 5 is a detailed vertical sectional view taken along the line 5—5 of Fig. 2 and showing the reduction gear drive for the agitator shaft of the dispenser.
Figure 6:
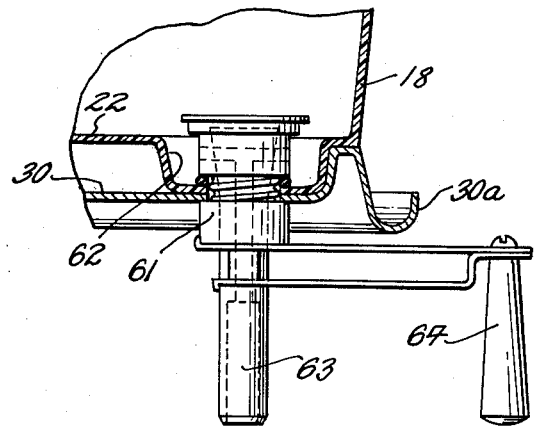
Fig. 6 is a detailed vertical sectional view taken through the receptacle section of the dispenser in the plane of the discharge valve.

Referring now to the drawings, the present beverage dispenser will be seen to comprise a lower cubical base section 10 including a flat bottom wall member 11 having an upturned marginal flange 12 carried within the lower end of a side wall housing 13. The housing 13 at its upper end is formed with an inturned top wall 15 which is provided in its central region with a relatively shallow trough formation 16 terminating in an upturned annular flange 17. The flange 17 of the top wall defines a central opening within the housing 13 for the reception of a cold plate to be hereinafter more fully described.

The dispenser further comprises an upper receptacle body 18 of substantially square or rectangular cross-sectional configuration which is provided with a frictionally fitting removable lid or cover 19. Preferably, the receptacle and cover members are formed from a suitable transparent or translucent synthetic resinous material through which the contents of the receptacle may be seen by an observer of the dispenser.

The receptacle includes a partial bottom wall 22 which is provided in its central region with a circular opening and is rabbeted, as at 23, about the opening to provide a relatively narrow shelf for the flush reception of the edges of a relatively thin, circular heat exchanger plate 24. The heat exchanger plate 24 is preferably formed from stainless steel, or other metal normally chemically inert to beverages received within the receptacle. The heat exchanger plate 24 in its central region is formed with a circular opening bounded by a slightly upturned flange 25, which receives a cylindrical tube or post member 26. A liquid-tight seal is provided between the post 26 and the upturned annular flange 25 of the heat exchanger plate by means of silver soldering continuously at the juncture of these two members, and the lower end of the post 26 terminates a distance below the lower surface of the heat exchanger plate 24 in an open mouth 27.

The marginal edge portion of the heat exchanger plate 24 is secured to the bottom wall 22, preferably, by means of a plurality of peripherally spaced depending screw threaded studs 28 which are welded to the lower peripheral edge portion of the plate 24, and which extend through openings 29 formed in the bottom wall 22 a distance outwardly from the central opening thereof. Additionally, the bottom wall 22 of the receptacle has secured thereto an annular drip tray 30 having an outer and upwardly turned flange 30a which serves to collect water which results from condensation of vapors upon the cool outer surface of the receptacle, and additionally as a handle for lifting the receptacle section onto and off of the base section of the dispenser. The drip tray 30 extends inwardly of the bottom wall 22 and is provided with a downwardly depressed portion 30b in vertically spaced relation to the bottom wall 22 to form a dead air pocket between the bottom wall 22 and the tray portion 30b and thereby effectively insulate the receptacle in this portion. Additionally, the tray is provided at spaced intervals with openings 31 for registration with the openings 29 formed in the bottom wall 22. In this manner, the threaded studs or bolts 28 carried by the heat exchanger plate 24 extend through the openings 29 and 31 and are engaged at their lower ends by cooperatively threaded clamping nuts 32 which function to hold the tray 30, receptacle 18, and the heat exchanger plate 24 as an integral unit and to effect a substantially liquid-tight seal between the bottom wall 22 and the heat exchanger plate 24. If desired, suitable non-toxic cements or calking materials may be employed at the juncture of the bottom wall 22 and heat exchanger plate 24 to additionally insure against leakage between these members.

Carried in depending relation to the heat exchanger plate 24, and spaced radially inwardly from the studs 28, is a second set of screw-threaded studs or bolts 33 which serves to support a relatively thickened and circular contact plate 34 of aluminum or other high heat conductivity metal in close heat transfer relationship with the lower surface of the heat exchanger plate 24. Due to the fact that it is practically impossible to obtain full area contact between the lower surface of the heat exchanger plate 24 and the upper surface of the contact plate 34, without resorting to expensive machining operations to produce exactly flat surfaces upon these members, we have found it advantageous to employ a relatively thin layer or film of a suitable mastic or adhesive, which possesses good heat transfer properties, between the mating surfaces of the heat exchanger plate 24 and the contact plate 34 to insure full area heat transfer between these members. Preferably, we employ a cement or adhesive which is loaded or substantially filled with aluminum or other metallic powder or dust having a high degree of heat conductivity. In this manner, good heat transfer between the full adjacent surfaces of the heat exchanger plate 24 and the contact plate 34 may be obtained without resorting to highly expensive machining or finishing operations to render the adjacent surfaces of these members perfectly flat.

Figure 4:
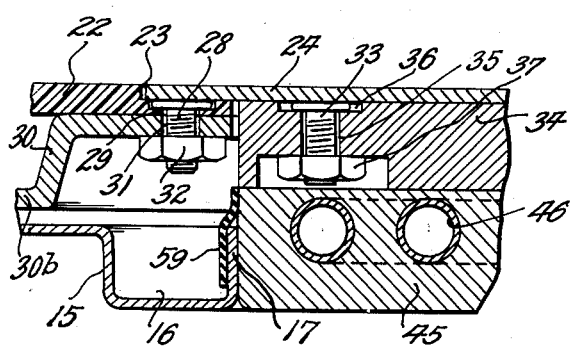
Fig. 4 is an enlarged fragmentary vertical sectional view showing the details of construction of the removable connection between the upper receptacle section and the lower base section of the present dispenser.

As shown particularly in Fig. 4 of the drawings, the studs 33 extend through openings or bores 35 formed in the contact plate 34, and the latter is recessed or countersunk at either end of the bores 35 to receive the heads of the studs 33 and a like number of clamping nuts 37, whereby the contact plate may be drawn into substantially tight engagement with the plate 24 while causing the nuts 37 and lower ends of the strip to terminates above the lower surface of the contact plate 34. The plate 34 is additionally formed in its central region with an axially disposed opening or bore through which the lower end portion of the post or tube 26 extends, with the opening being tapered at one end thereof to receive the outwardly flared flange 27 of the tube 26, the latter being flared outwardly after assembly of the contact plate upon the heat exchanger plate 24 to further aid in locking the plates 24 and 34 and tube 26 as a unit.

The tube or post member 26 carries in its upper end portion, as by a press fit, a cylindrical bushing 39 through which extends an elongated drive shaft 40 which terminates at its upper end in a cylindrical hub portion 41, and at its lower end in a rectangular or multi-surfaced drive extension 42. The hub portion 41 is formed with a pair of downwardly directed agitator or stirring rods 43 which terminate at their lower ends in inwardly turned extensions 44 positioned in substantially closely spaced relation to the upper surface of the heat exchanger plate 24.

Carried within the central opening defined by the upwardly turned flange 17 of the base housing 13 is a cold plate 45 in which is formed or embedded a continuous spirally wound evaporator coil 46, the latter being joined in the closed fluid transfer circuit of a standard refrigeration system contained in the base section and which includes a motor-driven compressor 47, condenser coils 48, and the evaporator coils 46. Advantageously, the motor for driving the compressor 47 is controlled by a thermostatic switch, not shown, which is responsive to the temperature of the heat exchanger assembly and indirectly responsive to the temperature of a beverage within the receptable 18, in order that the compressor may be energized as the temperature of the beverage and heat exchanger assembly rises to a given level, and deenergized upon cooling of the beverage to a predetermined desired temperature. As shown in Fig. 2, the elements of the refrigeration system are positioned within the base housing 13, with the condenser coils 48 adjacent one of the side walls of the housing 13 which is provided with suitable open grill work 50 by which the interior of the housing may be ventilated, and a fan or blower 51 driven by an electric motor 52 is positioned within the housing to circulate air over the condenser tubes 48 to cool the latter.

The electric motor 52 is further employed to impart rotation to the drive shaft 40 for the agitator or mixing rod 43. Toward this end, the motor 52 is provided at the end opposite the fan 51 with a reduction gear housing 52a which contains the armature shaft 52b of the motor, a worm gear 53, and a meshing pinion 54 carried by the lower end of a vertically arising shaft 55. The armature shaft 52b drives the worm 53 which, in turn, drives the pinion 54 and shaft 55 at a relatively reduced speed of rotation. The upper end of the shaft 55 has connected therewith and drivingly carries a socketed extension 56 whose upper end is formed with a socket of rectangular or multi-sided cross-sectional configuration for the reception of the multi-surfaced lower end 42 of the agitator shaft 40. The socket member 56 is rotatably journaled within a bearing sleeve 57 which extends through the central portion of the cold plate 45. The socketed member 56 and bearing sleeve 57 are so arranged as to extend upwardly a distance within the lower end portion of the tubular post 26 when the upper receptacle section is positioned upon the lower housing 13. Carried upon the outer peripheral edge of the cold plate 45 is a resiliently flexible skirt or gasket 59 of rubber or rubber-like material. The skirt 59 overlaps the upturned flange 17 of the housing and provides side insulation for the cold plate and also prevents the accumulation of moisture about the periphery of the cold plate.

Thus, the lower base section 13 houses all of the working mechanism of the dispenser and constitutes one section of the overall dispenser, while the upper receptacle portion with the heat exchanger plate 24, contact plate 34 and the agitator 43 constitute a separate section of the dispenser which may be removed as a unit from the lower base section of the dispenser. The cold plate is so arranged as to be directly contacted by the lower surface of the aluminum contact plate 34 when the receptacle section is positioned upon the base housing 13, and the lower end portion 42 of the agitator shaft 40 is arranged to snugly fit within the drive socket 56, in order that rotation may be imparted to the agitator upon engagement of the separate receptacle and base section of the dispenser.

Advantageously, the lower surface of the cold plate 45 may be provided with suitable thermal insulation material, not shown, to prevent or minimize loss of cooling effect had by the cold plate through its lower portion, and to cause substantially all heat transfer to take place through the contact plate 34 and heat exchanger plate 24, and thence to the body of fluid or liquid contained within the receptacle 18.

As shown particularly in Fig. 1 of the drawings, the front side wall of the base housing 13 is provided with an inwardly directed recess 60 for the reception of a drinking glass or other receptacle into which the refrigerated beverage is to be discharged. The recess 60 receives the lower end portion of a manually operated shut-off valve 61 having an inlet end communicating with a sump depression 62 formed in the bottom wall of the receptacle 18, and having an outlet nozzle 63 projecting downwardly into the recess 60. The valve 61 is operated by means of a handle member 64 which extends outwardly from the recess 60 for manipulation by an operator. The bottom wall of the recess 60 is provided with a suitable drain opening 65 through which excess spilled beverage and extraneous matter may pass to a lower drainage compartment, not shown, having a removable clean-out drawer 66.

As shown in Fig. 2, a switch and junction box 68 is provided within the housing 13, and contains a master switch toggle 69 of the on-off type which switch is so connected in circuit with the motors 52, and the motor driving the compressor 47, as to close operating circuits therefor, but as previously mentioned, the compressor motor is connected in series circuit with a suitable thermostatic switch to control energization thereof in accordance with the temperature of the heat exchange assembly and the beverage contained within the receptacle.

In operation, the receptacle section of the dispenser is first thoroughly cleansed and placed upon the base section with the contact plate 34 resting directly and flatly upon the cold plate 45. The upper hub portion 41 of the agitator is rotated manually to cause the lower multi-sided shaft extension to drop within the motor-driven socket extension 56. After assembly, the receptacle 18 is filled to a desired level with a liquid beverage and the master switch 69 turned to its on position. This energizes operating circuits for the motor 52 and the compressor motor to operate the agitator and fan and to place the refrigeration system in operation.

As the cold plate 45 is progressively cooled, so also the contact plate 34, heat exchanger plate 24 and the beverage within the receptacle are progressively cooled to a desired low temperature. When the desired low temperature of the beverage is attained, the motor driving the compressor is deenergized by action of a thermostatic switch, preferably positioned in close thermal proximity to the cold plate, in a manner well known in the refrigeration art, to thus arrest further action of the refrigeration system until the beverage and heat exchanger assembly reaches a predetermined elevated temperature, at which time the compressor motor is once again automatically energized to maintain the temperature of the beverage at a substantially constant low level.

After the contents of the receptacle have been dispensed, or after a predetermined time interval, the switch 69 may be turned off and the receptacle section removed from the base section to permit of washng or other cleansing and sterilizing operations without disturbing or moving the base section of the dispenser.

In view of the foregoing, it will be seen that the present invention provides an efficient and compact liquid cooling and dispensing apparatus particularly adapted for storing and refrigerating non-alcoholic beverages such as fruit juices or the like, and wherein such dispensers are characterized by separable sections greatly facilitating the cleaning and sterilization of those parts of the dispenser normally coming into direct contact with the beverage. Further, dispensers formed in accordance with the present invention are characterized by a high degree of efficiency of heat exchange, while at the same time providing for physical separation of the members to be cooled from the cooling element of the dispenser.

While a single preferred embodiment of the invention has been shown and described in detail, it will be understood that various modifications as to details of construction and design may be resorted to without departing from the spirit of the invention or the scope of the following claims.

We claim:

1. In a refrigerated beverage dispenser; a base housing having a partial top wall; refrigeration apparatus carried in said base housing and including a flat disk-shaped cold plate having a flat annular upper surface exposed at the top wall of said base housing and a centrally disposed opening extending through said cold plate, said refrigeration apparatus being operable to circulate a refrigerant through said cold plate to chill the latter; a bearing sleeve extending axially through and carried in the opening of said cold plate; a rotary socket member journaled in said bearing sleeve; motor and drive means in said base housing connected to rotate said socket member; a separate receptacle body to receive a beverage to be dispensed and having a partial bottom wall; a flat annular corrosion-resistant heat exchanger plate carried by the partial bottom wall of said receptacle body and forming a flat continuation thereof, said heat exchanger plate being arranged for direct contact with a beverage contained in said receptacle body; an annular disk-shaped contact plate of high heat conductivity metal connected directly with said heat exchanger plate and having a flat annular bottom surface arranged for direct surface-to-surface contact with the flat annular upper surface of said cold plate when said receptacle body is positioned on said base housing; a vertically arranged tube having a lower end portion extending axially through and carried by said heat exchanger plate and said contact plate and terminating in an opening adapted to receive an end of said bearing sleeve, said tube extending vertically upwardly in said receptacle body and terminating at its upper end above the normal level of a beverage within said receptacle body; shaft means journalled in said tube and having a lower end portion arranged to fit within said socket member when said receptacle body is positioned upon said base housing; and a rotary agitator extending downwardly within said receptacle body from the upper end of said tube and connected with said shaft means; said receptacle body, heat exchanger plate, contact plate, tube, shaft means and agitator being removable as a unit from said base housing.

2. In a refrigerated beverage dispenser; a base housing having a partial top wall; refrigeration apparatus carried in said base housing and including a cold plate having a flat upper surface exposed at the top wall of said base housing and terminating a substantial distance inwardly from the outer margins of the top wall of said base housing, said cold plate being formed with a centrally disposed opening extending therethrough, and said refrigeration apparatus being operable to circulate a refrigerant through said cold plate to chill the latter; a bearing sleeve extending axially through and carried in the opening of said cold plate; a rotary socket member journaled in said bearing sleeve; motor and drive means in said base housing connected to rotate said socket member; a separate receptacle body adapted to receive a beverage to be dispensed and having a partial bottom wall; a flat, corrosion-resistant heat exchanger plate carried by the partial bottom wall of said receptacle body and forming a flat, central continuation thereof, said heat exchanger plate being arranged for direct contact with a beverage contained in said receptacle body; a contact plate of substantial thickness formed from a high heat conductivity metal and connected in directly depending relation to said heat exchanger plate, said contact plate being formed with a flat bottom surface of substantially the same dimensions as the upper surface of said cold plate and arranged for direct surface-to-surface contact with the upper surface of said cold plate only when said receptacle body is positioned on said base housing; a vertically arranged tube having a lower end portion extending axially through and carried by said heat exchanger plate and said contact plate and terminating in an opening adapted to receive an end of said bearing sleeve, said tube extending vertically upwardly in said receptacle body and terminating at its upper end above the normal level of a beverage within said receptacle body; shaft means journaled in said tube and having a lower end portion arranged to fit within said socket member when said receptacle body is positioned upon said base housing; and a rotary agitator extending downwardly within said receptacle body from the upper end of said tube and connected with said shaft means; said receptacle body, heat exchanger plate, contact plate, tube, shaft means and agitator being removable as a unit from said base housing.

References Cited in the file of this patent

UNITED STATES PATENTS

| | | |
|---|---|---|
| 2,494,719 | Rabjohn | Jan. 17, 1950 |
| 2,502,589 | Rabjohn | Apr. 4, 1950 |
| 2,513,610 | Williams | July 4, 1950 |
| 2,629,236 | Hull | Feb. 24, 1953 |